United States Patent
Stokes et al.

(10) Patent No.: US 10,121,106 B2
(45) Date of Patent: Nov. 6, 2018

(54) SPECTRAL DATA ANALYTIC CUBE CLASSIFIER (SPADACC) FOR CONTINUOUS WIDE AREA GEOSPATIAL MODELING USING NORMALIZED AND HIGHLY DIMENSIONAL MULTISPECTAL RASTER DATA

(71) Applicant: DIGITALGLOBE, INC., Longmont, CO (US)

(72) Inventors: James Stokes, Richmond, VA (US); Mark Giaconia, Herndon, VA (US)

(73) Assignee: DIGITALGLOBE, INC., Longmont, CO (US)

( * ) Notice: Subject to any disclaimer, the term of this patent is extended or adjusted under 35 U.S.C. 154(b) by 626 days.

(21) Appl. No.: 14/788,651

(22) Filed: Jun. 30, 2015

(65) Prior Publication Data
US 2015/0379431 A1    Dec. 31, 2015

Related U.S. Application Data

(60) Provisional application No. 62/019,400, filed on Jun. 30, 2014.

(51) Int. Cl.
*G06N 7/00* (2006.01)
*G06T 17/05* (2011.01)

(52) U.S. Cl.
CPC ............ *G06N 7/005* (2013.01); *G06T 17/05* (2013.01); *G06T 2200/16* (2013.01)

(58) Field of Classification Search
None
See application file for complete search history.

(56) References Cited

U.S. PATENT DOCUMENTS

| | | | | |
|---|---|---|---|---|
| 8,913,826 | B2* | 12/2014 | Padwick | G06K 9/0063 382/165 |
| 9,122,930 | B2* | 9/2015 | Tabb | G06T 7/70 |
| 9,396,391 | B2* | 7/2016 | Navulur | G06K 9/00476 |
| 9,600,740 | B2* | 3/2017 | Tang | G06K 9/48 |
| 9,710,714 | B2* | 7/2017 | Chen | G06K 9/00798 |
| 2005/0047663 | A1* | 3/2005 | Keenan | G06K 9/0063 382/225 |
| 2010/0046842 | A1* | 2/2010 | Conwell | G06F 17/30265 382/218 |

(Continued)

OTHER PUBLICATIONS

Zhang et al, "A Pixel Shape Index Coupled with Spectral Information for Classification of High Spatial Resolution Remotely Sensed Imagery", Oct. 2006, IEEE Transaction of GeoScience and Remote Sensing, vol. 44 No. 10, pp. 2950-2961 (Year: 2006).*

(Continued)

*Primary Examiner* — Paulinho E Smith
(74) *Attorney, Agent, or Firm* — Galvan Patent Law LLC; Brian R. Galvin

(57) ABSTRACT

A system for enhanced geospatial modeling using a spectral data analytic cube classifier and normalized multispectral raster data, comprising a geospatial modeling server that receives and analyzes input imagery, a data import/export server that provides data for review or interaction and receives data to provide to the analysis server, and a database that stores data, and a method for enhanced geospatial modeling using raster data according to the system of the invention.

2 Claims, 7 Drawing Sheets

(56) References Cited

U.S. PATENT DOCUMENTS

| | | | |
|---|---|---|---|
| 2011/0034176 A1* | 2/2011 | Lord | G06F 17/30244 |
| | | | 455/450 |
| 2011/0143811 A1* | 6/2011 | Rodriguez | G06K 9/00986 |
| | | | 455/556.1 |
| 2011/0212717 A1* | 9/2011 | Rhoads | G06F 17/30241 |
| | | | 455/420 |
| 2011/0295575 A1* | 12/2011 | Levine | G06Q 30/02 |
| | | | 703/2 |
| 2013/0151148 A1* | 6/2013 | Parundekar | G01C 21/3679 |
| | | | 701/521 |
| 2014/0050368 A1* | 2/2014 | Poulsen | G06K 9/0063 |
| | | | 382/113 |
| 2014/0071287 A1* | 3/2014 | Tu | H04N 7/181 |
| | | | 348/150 |
| 2014/0080428 A1* | 3/2014 | Rhoads | G06F 17/30241 |
| | | | 455/88 |
| 2014/0229420 A1* | 8/2014 | Green | G06Q 90/00 |
| | | | 706/52 |
| 2015/0379431 A1* | 12/2015 | Stokes | G06T 17/05 |
| | | | 706/11 |
| 2016/0125307 A1* | 5/2016 | Zheng | G06N 3/08 |
| | | | 706/12 |
| 2016/0379388 A1* | 12/2016 | Rasco | G06T 11/206 |
| | | | 715/753 |

OTHER PUBLICATIONS

Wang et al., "A Lidar Point Cloud Based Procedure for Vertical Canopy Structure Analysis and 3D Single Tree Modelling in Forest", Jun. 12, 2008, Senors, pp. 3938-3951 (Year: 2008).*
Solberg, "Contextual Data Fusion Applied to Forest Map Revision", May 1999, IEEE Transactions on Geoscience and Remote Sensing, vol. 27 No. 3, pp. 1234-1243 (Year: 1999).*

* cited by examiner

SPECTRAL DATA ANALYTIC CUBE CLASSIFIER (SPADACC) FOR CONTINUOUS WIDE AREA GEOSPATIAL MODELING USING NORMALIZED AND HIGHLY DIMENSIONAL MULTISPECTAL RASTER DATA

CROSS-REFERENCE TO RELATED APPLICATIONS

This application claims the benefit of, and priority to, U.S. provisional patent application Ser. No. 62/019,400, titled "ENHANCED GEOSPATIAL MODELING USING RASTER DATA" and filed on Jun. 30, 2014, the entire specification of which is incorporated herein by reference in its entirety.

BACKGROUND OF THE INVENTION

Field of the Art

The disclosure relates to the field of image processing, and more particularly to the field of extracting and modeling features from satellite-based multispectral imagery.

Discussion of the State of the Art

By utilizing historic event or training points to teach an algorithm to identify patterns and relationships associated with explanatory variables included in the analysis (factors); one can determine where those patterns are present within a broader user defined environment. Historically, the training factors used have been limited to vector based formats with limited application for raster based factors, or they have incorporated overly simplistic methods of representing the dimensionality of highly noisy image data. The vector-based factors represent portions of the human, physical, and built environments which define the study area. By examining the correlations (both spatial and attribute) between factors and events, one is able to shed light on latent relationships and patterns that may have otherwise gone unnoticed if relying on traditional geostatistical procedures.

This premise of using raster data to generate a highly dimensional space as a factor source was previously made challenging (and therefore ignored) by a lack of imagery sources that had been standardized based on spectral returns. That is, imagery that was not radiometrically calibrated over various times and areas could not be used to generate predictions. However, the inventor has a working implementation of Atmospheric Compensation (ACOMP), which mitigates and minimizes these unavoidable problems. Moreover, material selection is a critical aspect of this algorithm, because a training point is only truly represented in imagery, if the actual material that the point represents is physically present in the image. For instance, in attempting a "more like this" (MLT) classifier to discover a certain type of vegetation, the training point is only relevant if the underlying image that the model is created from actually contains that vegetation type in bloom at the time of image capture.

Through a series of case studies, the value of this new analytics opportunity has been quantified. A first case examines relationships between reflectance values and training events. A spatial event with high visibility, and a frequent collection posture, was selected; namely, marijuana fields in a particular US region, in which 8 training points were utilized and over 40 million pixels classified. The process used is somewhat similar to supervised classification with spatial proximity to training events automatically driving the cataloging of significant reflectance values, rather than a user doing so manually, although the generation of these features within this invention is done using minimally parametric cascading unsupervised pixel band ratio clustering. Those reflectance values that do not demonstrate any relationship to the training events would be ignored in subsequent phases of the process, while those areas exhibiting significant relationships with the events would be highlighted just as a vector-based factor would be. In this way, it is possible to leverage imagery to help tell a story about the surrounding geography and the spatiotemporal conditions that may be acting as drivers of a particular activity. Also, the signature of the spectrum themselves on the training point are a significant factor as well, depending on the size of the neighborhood of pixels. Furthermore, the specific implementation of this invention will respond well to cross seasonal data in some cases, as long as enough training points can be provided, because the algorithm does not merge and average training samples, rather the final SPADACC is actually a List of cube classifiers in which the best score is returned from completely separate comparisons.

Once proven, this identified reflectance signature can then be utilized to search a standardized historical archive or new standardized collection for a signature match. This would allow for spectrally-based object, area, or environment discovery. Once generated and cataloged, these reflectance signatures could be automatically run against all incoming imagery providing a "tipper" for the event in question and quickly narrowing down search space by providing more directed and productive analysis of the imagery. As this analytics technique becomes more pervasive, the library of these signatures will continue to grow and in turn further expand our understanding of geographic influence on behavior.

A secondary case study used imagery as a standalone factor for analyzing environmental phenomenon. By looking at the relationship between surface reflectance values and environmental occurrences (e.g. sink holes, subsidence, landslides), it was determined that one can leverage imagery as a standalone factor to predict environmental conditions such as potential mining locations, habitat suitability, or substrate stability. This technique offers benefits to traditional analytical workflows that are being conducted in regions with little vector data to act as factors (for example, emerging areas of interest that have little geospatial statistical data about demographics and economics available, but for which satellite imagery is available). Filling these data gaps with imagery will drastically reduce limitations associated with lean data areas of interest and significantly expand the geography within which one can effectively conduct predictive analysis. Moreover, with this invention, the exact spectral characteristics are combined with the characteristics of surrounding features, as described by pixel clustering, depending on the configuration of the buffer of pixels around each training point that the models are based on.

At the core of this analytical benefit is the relationship of the location of events to the surface reflectance values across an image with standard characteristics. This application does not require that spectral signatures that match ground surface features be determined in advance in order to classify the surface in relation to the events. What it does put forward is that the normalized pixel values can be utilized to determine if the events have certain coincident pixel characteristics in common across all the pixels within an area of interest (or even globally). These methods are not possible unless the imagery utilized is standardized based on surface reflectance in a way that ensures that signatures match across temporal and geographic variations in collects. Furthermore, the current implementation of this invention does not use simple NND, it uses N dimensions of distance and direction as features.

To address the problem of normalization of pixel values across image captures from the satellite, the invention uses a process called "Atmospheric Compensation" (ACOMP), as this provides the best data source for the invented algorithm due to its spectral normalization.

SUMMARY OF THE INVENTION

Accordingly, the inventor has conceived and reduced to practice, in a preferred embodiment of the invention, a system and method for enhanced geospatial modeling that utilizes multispectral aspects of image data and that utilizes pre-normalized input imagery and algorithmically identifies and extracts image features based on known points in order to construct a novel cube like model, enabling more advanced modeling than is currently possible in the art because the Cube model can integrate raster spectral data dynamically and robustly because of the sophistication of the representation of the dimensionality. Another novel aspect of the algorithm is that it is not a simple next-nearest-neighbor (NND) model. The Cube model constructs an N dimensional space of categorical class labels with N dimensional vector spaces representing distance and direction from each categorical class. Moreover, the categorical class labels are derived automatically via an unique sub-invention for unsupervised clustering, so no supervised model or knowledge base is required for this algorithm. This cube will be referred to as the Spatial Data Analytical Cube Classifier (SPADACC).

According to a preferred embodiment of the invention, a system for enhanced geospatial modeling using a spectral data analytic cube classifier and normalized multispectral raster data, comprising: a geospatial modeling server computer comprising program code stored in a memory and adapted to analyze and process input imagery for normalization and feature extraction, and to provide the normalized image data to other components of the system; a database computer comprising program code stored in a memory and adapted to store data received from other components of the system and provide the data for future review as needed; and a data import/export server computer comprising program code stored in a memory and adapted to provide data from other components of the system for review or interaction by a human user or external hardware or software devices, and to receive data from a human user or external software or hardware devices and provide the data to other components of the system, is disclosed.

According to another preferred embodiment of the invention, a method for geospatial modeling using raster data, comprising the steps of: receiving, at a geospatial analysis server, a plurality of input image data; calculating raw factor data based at least in part on at least a portion of the input image data; building a plurality of probability density functions based at least in part on at least a portion of the raw factor data; building a plurality of assessment layers based at least in part on at least a portion of the probability density functions; and building a final assessment based at least in part on at least a portion of the assessment layers, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
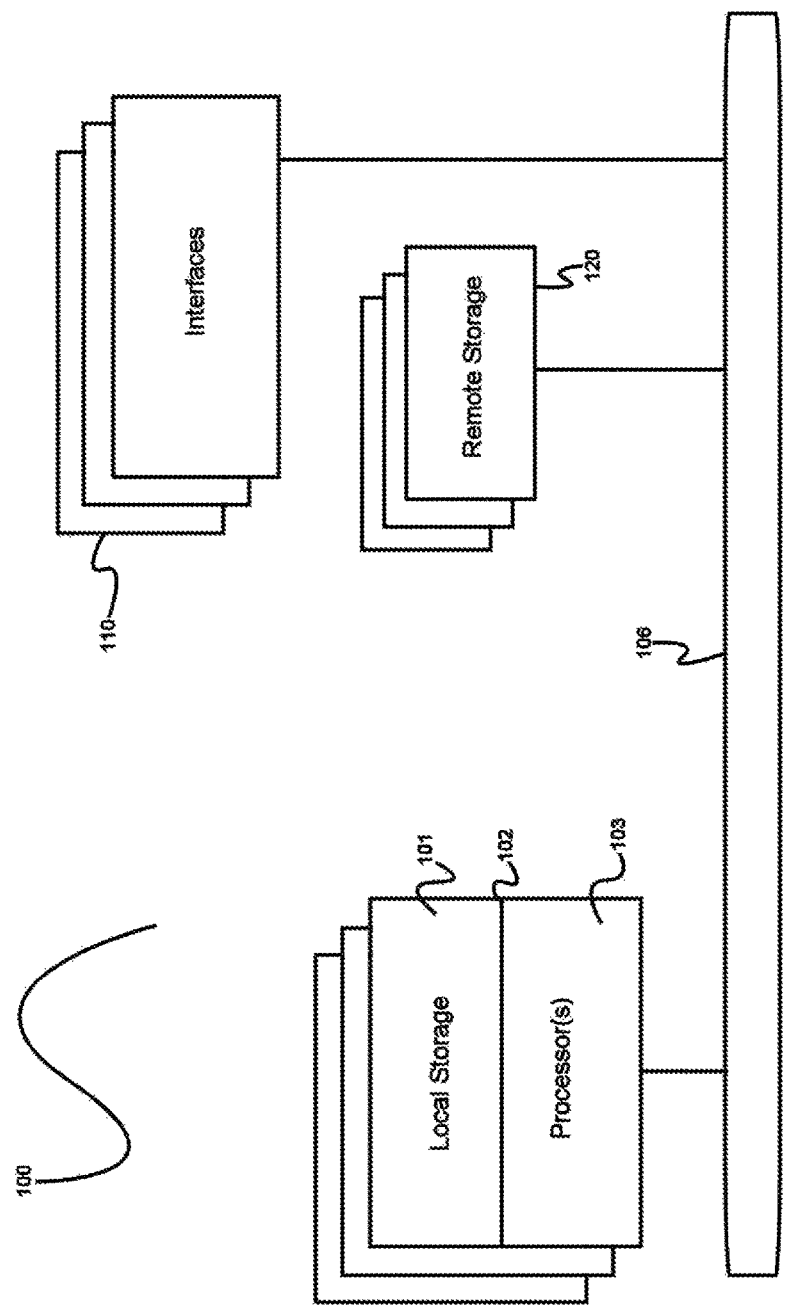
FIG. 1 is a block diagram illustrating an exemplary hardware architecture of a computing device used in an embodiment of the invention.

The inventor has conceived, and reduced to practice, in a preferred embodiment of the invention, A system and method for enhanced geospatial modeling using raster data, that normalizes input imagery and algorithmically identifies and extracts image features, enabling more advanced modeling than is currently possible in the art.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
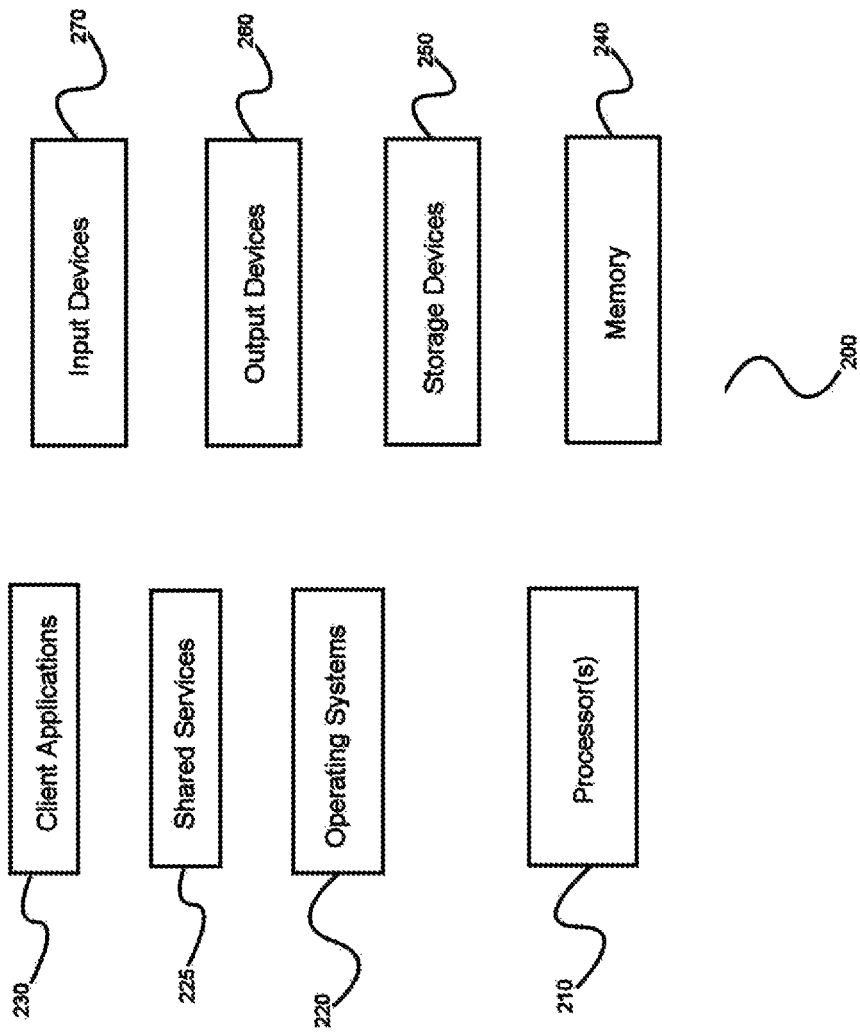
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
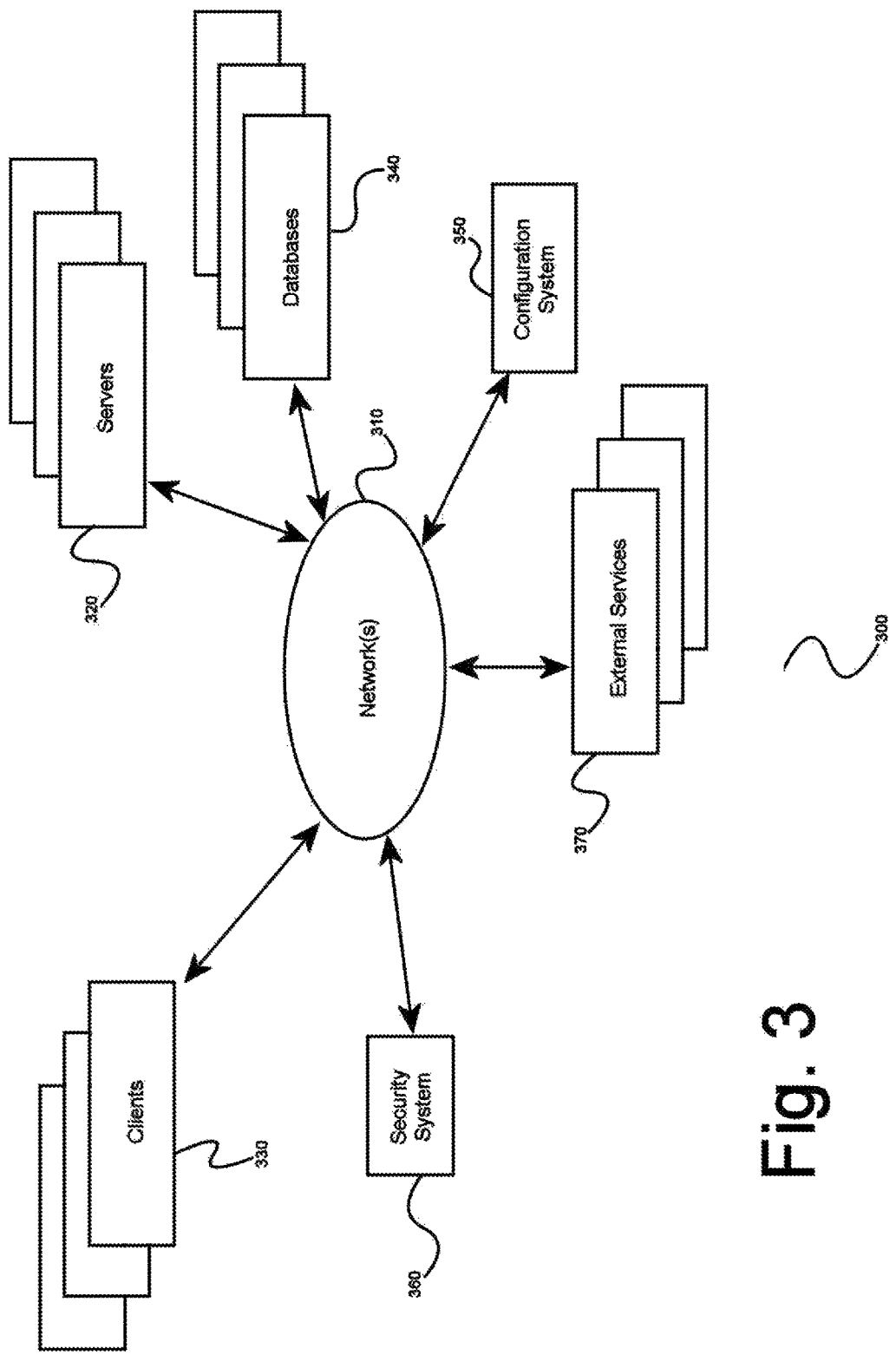
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
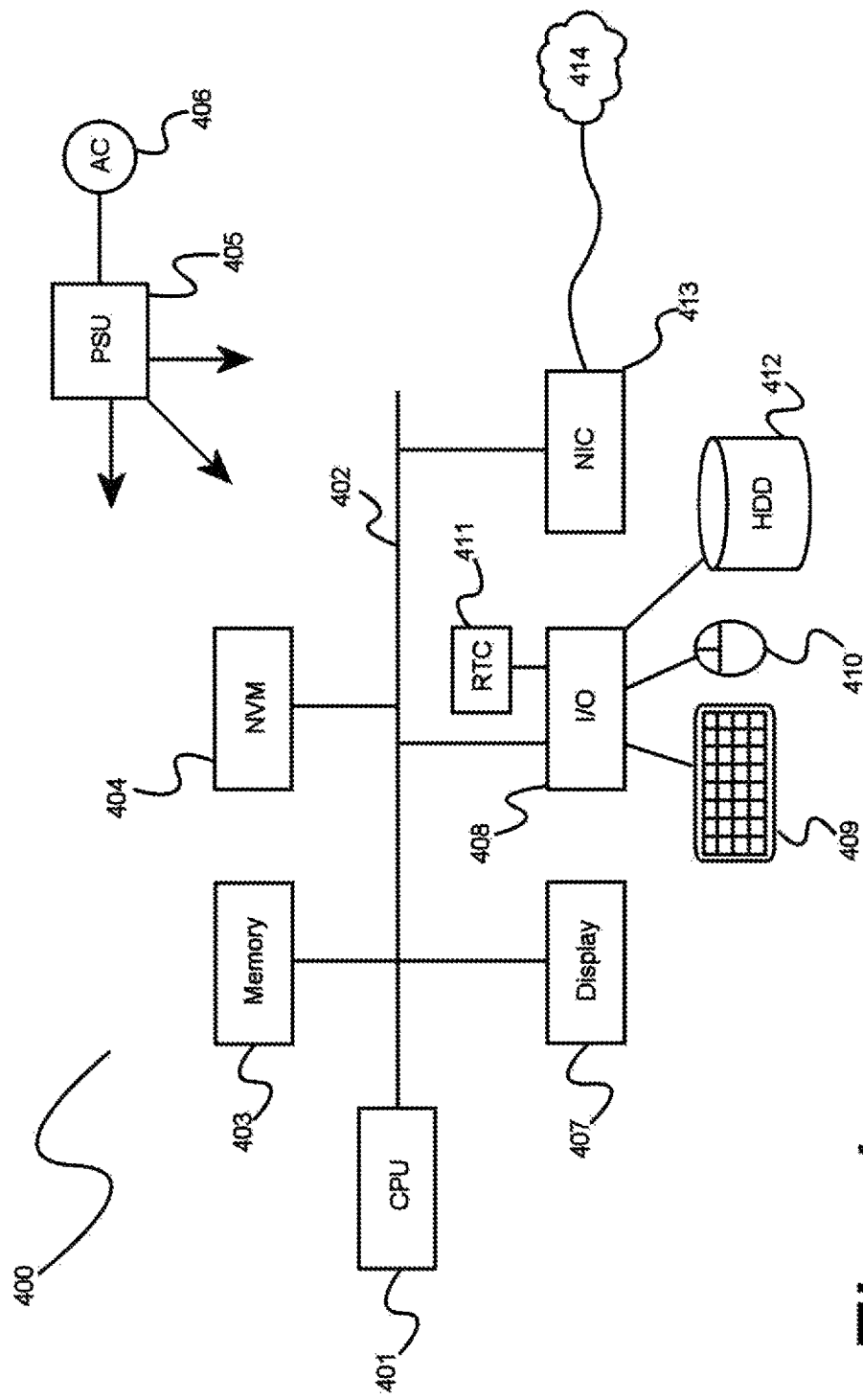
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
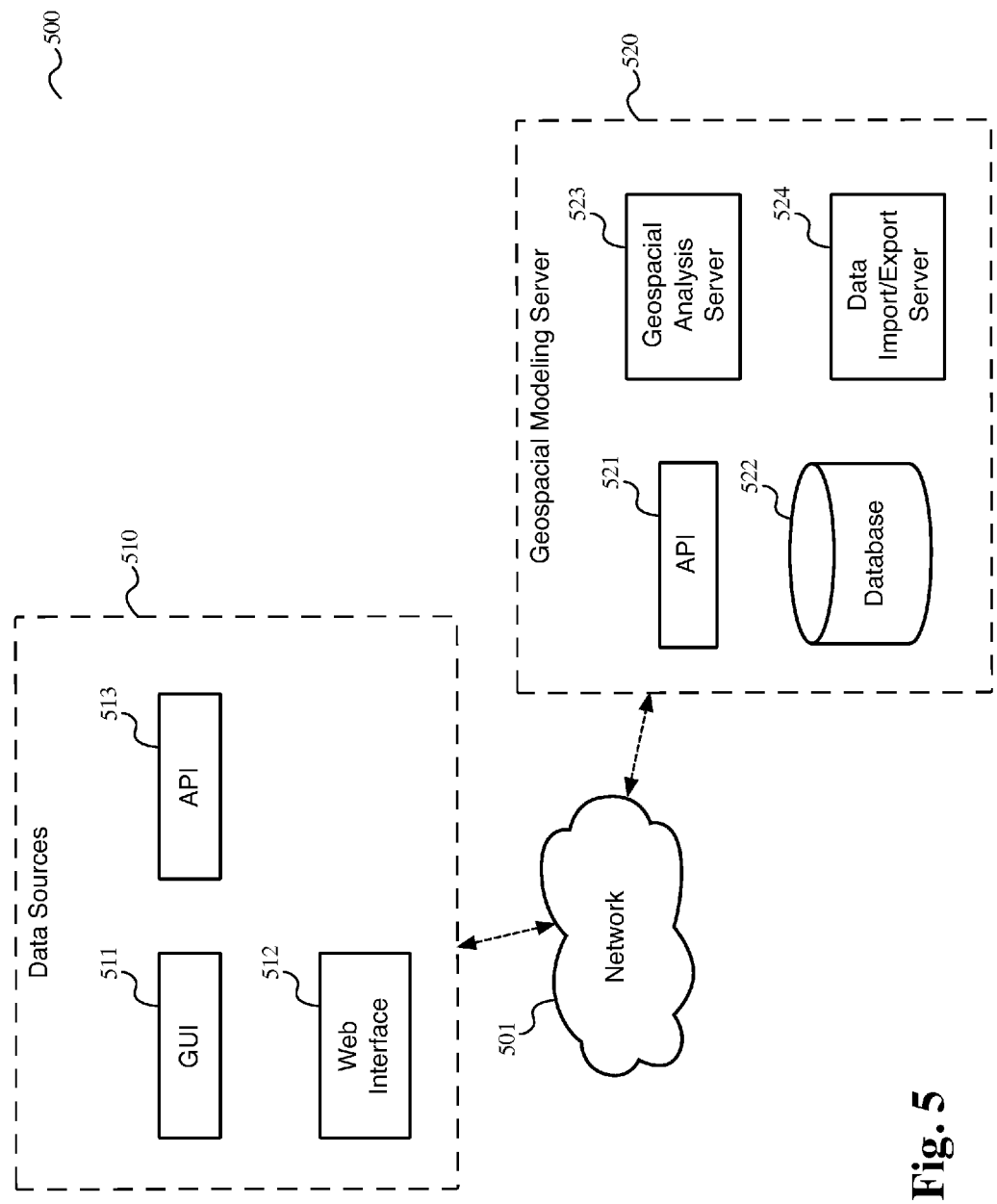
FIG. 5 is a block diagram of an exemplary system architecture for geospatial modeling, according to a preferred embodiment of the invention.

FIG. 5 is a block diagram of an exemplary system architecture 500 for geospatial modeling, according to a preferred embodiment of the invention. As illustrated, a geospatial modeling server 520 may comprise a plurality of components that may be interconnected or in communication with each other such as via a network or direct connection (such as, for example, a cable or other physical connection). Components of a geospatial modeling system 520 may include (but are not limited to) a software application programming interface (API) 521 that may comprise at least a program code stored in a memory and operated on a computing device such as a server or workstation computer, and may be adapted to receive data across a network 501 (such as data provided by any of a variety of data sources 510, as described below) and provide that data for use by other components of a geospatial modeling system 520, a database 522 that may be a computing device operating program code stored in a memory and adapted to store information and provide stored information for use by other components of a geospatial modeling system 520 (for example, for use in storing a database of radiometric or other image signatures), a geospatial analysis server 523 that may be a computing device operating program code stored in a memory and adapted to perform image analysis and feature extraction operations such as those described below (referring to FIG. 6), and a data import/export server 524 that may be a computing device operating program code stored in a memory and adapted to receive data from components of a geospatial modeling system 520 and make the data available for interaction by a human user, as well as to receive input information from a human user and provide that information to other components of a geospatial modeling system 520, thereby facilitating two-way interaction between a user and the geospatial modeling system 520.

As further illustrated, a geospatial modeling system 520 may be in communication with a plurality of external data sources 510, for example via a network 501 such as the Internet or other suitable data communications network. Exemplary data sources may include (but are not limited to) a graphical user interface (GUI) 511 that may be a program code stored in a memory and operated by a computing device such as a personal computer or mobile computing device (such as a smartphone or tablet computing device, for example) and adapted to receive interaction from a human user, a web interface 512 that may be a program code stored in a memory and operated by a computing device such as a server or workstation computer and adapted to receive interaction from a human user via a web browser or other web-enabled software application (as is common in the art), or an API 513 that may comprise a program code stored in a memory and operated by a computing device such as a server or workstation computer and adapted to facilitate interaction between software applications and a geospatial modeling system 520, for example via integration with various third-party or external products or services, such as to enable various functionalities provided by a geospatial modeling system 520 within the external or third-party product or service.

As better resolution of imagery and more spectral coverage are becoming available (which is happening continuously), and as better radiometric calibration techniques allow comparison of a wider range of raster data taken over time, pixel values become valuable in their own right and can be used to classify events, locations, etc. Focus may be on continuous pixel ranges that correlate with objects on ground. Two modes may be used: supervised, where a user may input "these pixels are pine trees", and the system then looks for similar pixel groups/patterns elsewhere and assigns them the attribute "pine trees"; and unsupervised, where machine learning does the first step as well. Given a set of events, supervised classification may be possible if more spectral coverage of higher resolution is available, looking for patterns of objects that can be associated with the events. That is, each pixel may be considered to be a "token", and a user may look for patterns of tokens. But it should be noted that the technique is not limited only to pixels; the technique may utilize hierarchical decompositions of images (pixel/region/scene level) to perform predictive analyses at a higher level of granularity (such as geometric arrangements, for example "this pattern of four pixels with certain radiometric attributes has been correlated with a missile site", so now the system can look for other missile sites, even in other global areas).

According to the embodiment, the size of an area of interest (AOI) and its shape may be configurable (such as by a user interacting via a web application 512 or GUI 511, as described above). For example, a series of events may occur that are geographically correlated. An AOI is designated around one or more of these events, and analyzed to look for patterns that can be utilized to identify similar events in the past, and to predict similar events in the future, even in distant locations. It may be desirable to make radiometric background adjustments in some cases when looking for patterns (for instance, evidence of change needs to be considered insight of preexisting radiometric signatures, and are relative values, as opposed to a missile site pixel pattern, which might be an absolute radiometric phenomenon associated with actual equipment required at a particular kind of missile site). It should be appreciated that this process can be used to detect spatial and temporal patterns, which is particularly valuable given that over a decade's worth of image data is readily available for most locations. One key limitation that the invention addresses is the need for radiometric balancing of orthomosaics so that a user is looking at calibrated, more useful data.

According to the invention, there are several dimensions that can be used to analyze data to detect patterns: spectrum (frequency domain), temporal (time domain), geospatial (spatial domain), and attribute domains (texture, demographic dimensions, etc.), any combination of which may be combined in a particular predictive analysis, either in a supervised way or via machine learning. Also it may generally be assumed that very fine spectral resolution is available; spectral data from different assets (for example, satellites or other assets) may then be combined if radiometrically balanced first. For example, most bands in an exemplary "satellite 1" will be different than those in an exemplary "satellite 2", so there may be a large number of bands of coverage once "satellite 1" is launched and begins collecting imagery (and then of course various spectral bands from other collection assets may be utilized as appropriate). This produces a rich frequency domain coverage, which can be combined into a single near-real-time orthomosaic using post-processing.

Exemplary Use Cases

According to the embodiment, a geospatial analysis system may look for very small objects such as IEDs (improvised explosive devices) or other features that may be visible in imagery. A system may also conduct near-real-time (NRT) change-based analytics: change detection has traditionally been done, for example, by comparing one image from before a storm, and one from after; now one could compare progress of the storm itself, and could look at more gradual changes with better time and space resolution/granularity (for instance, every hour or two in "hot areas", which could be fire hazard areas, military hot areas, etc.).

Another use may be oil spill and forest/wild fire detection and characterization in real time. A user could look at how hydrocarbon signature changes over time as it is exposed to air; this can be used to detect age and progress of oil spills, or could be used to conduct forensic investigation and attribution of such spills to responsible actors. That is, a user may track location and spectral signature of a slick (or a fire) over time, and knowing how spectrum changes over time can indicate where it started, whether it is still getting new oil added, etc.

Seismographic data may be utilized as well, which would facilitate additional use cases. For instance, seismic events may be correlated with imagery and, with changes in imagery, could be identified soon after the fact (i.e., after the seismic event).

Masking may be performed to mask features one is focusing on, or which one wants to eliminate. For instance, a user may use a road mask to analyze events occurring near roads; one could then look for spectral changes in a given mask. This, in effect, is like having a set of generalized coordinates (locations within a road network). For example, approved utility work could be a set of data, aligned with a road mask. Then events that do not correlate with the approved utility work could be signature of an event of interest, such as the planting of an IED (roads are often repaved after an IED is planted, so what looks like "normal" road repair is actually a threat). Knowing what is expected in terms of repairs and what is not can help to interpret such changes, which could be detected (recently "repaired" roads look different, and could be detected by satellite, especially a spectrally-dense, VHR satellite).

Precision Ag (agriculture): Remote sensing could take this to another level. Consider widely separated AOIs. A user could analyze a series of similar events in separate AOIs rather than a cluster of events in a single AOI. Doing this requires radiometric balance and good background imagery information (needed to understand what is different than normal in order to standardize event signatures). Not all events will implicate the same factors: "event 1" may be affected by/affect factors A-D, while "event 2" implicates factors C-F, "event 3" factors E, A, G, and so forth. Because of this, small sets of events weren't always useful previously. But, with properly normalized imagery, at least one set of factors (driven by the imagery) will be constant, thus making it possible to predict more sporadic events using small sets of events, even widely spatially separated. For instance, certain activities may always occur within a riverbed or similar depression, or at the outskirts of a village.

An exemplary GUI 511 may be a digital globe (DG), representing the actual Earth and that may show events that have occurred anywhere on the globe. Upon selecting a plurality of distributed events on the DG (with for example a touch screen), other areas of may glow or be otherwise visually indicated because they match. A user could display a heat map showing degree of match, suggesting likely areas of concern for similar events, or likely areas to check for past events of similar nature. If the user finds such past events, they may then refine the relevant signatures. This iterative use of past events has not been done before and could make the utility offered by the invention much more powerful, since a large library of very high-resolution (VHR) imagery exists today, taken over significant period of time (over ten years of daily captures). In principle, even a very small number of new events could lead to development of a very robust signature that could be regionally or globally invariant. A user may conduct analysis in scenarios that are not data-rich. For example, Somalia does not generate very much high-quality data, and so is effectively "black" to previous factor-centric predictive analytics tools. But with the instant invention, particularly since much VHR imagery exists of Somalia, there is a high likelihood of achieving excellent analysis capabilities using the instant invention and raster imagery of Somalia.

Classification Approach

The current implementation of this invention uses a NearestMean classifier. However, any standard classification method that can be trained on real valued vector representations that return either a sorted or sort-able distribution of probabilities for each class label or a simple "best" class label will be sufficient. For the current working implementation, a NearestMean classifier was used because the nature of the SPADACC model is that it uses centroid (mean) vectors that are derived from the unsupervised clustering of pixels from around each training point. Since the concept of vector centroid representation using a mean representation is central to the system, the theme was extended into the classification level of the algorithm—although there is no need to constrain the system in this way.

The SPADACC's "compare" function is essentially an averaging of vector space cosine similarity scores over each common class, its distance vectors, and its direction vectors, where each of these three spaces can be of N dimensions. Moreover, any spatial data can be injected into the SPADACC to enrich the model. For SPADACCs with many distances and directions, and with many training points, it is not uncommon to have thousands of dimensions within the SPADACC.

The clustering Algorithm is a unique and key part of the SPADACC. This clustering approach is novel in that it is adaptive to the disparity of data within the images. Moreover, all clustering is done on band ratios, rather than raw ACOMP band values. The Clustering algorithm is referred to in the code base to this invention as a vector space clustering model. The clustering is performed in the following steps, and this algorithm should be considered a sub component of the invention and therefore also fall under the same patent as a dependency.

a. All data is represented as a Vectorizable object, and all data, in this case band ratios for imagery (28 dimensions as of this writing)

b. The data is passed into a cluster function as a List. The Cluster function requires two parameters, precision, and augmentation. Any comparison during clustering that returns a score lower than the precision, will become a candidate for becoming its own centroid, any value higher will then be tested against the augmentation parameter. If a comparison is greater than the precision value, and greater than the augmentation value, the data point will be added as a sample to the already existing centroid that it was "attracted to." There is another option, in which no parameters are specified (other than the data) and a ParamterEstimation algorithm is utilized behind the call to generate these two parameters based on collected statistics on the data that was passed in.

c. The cluster function begins a process in which N data points (a fraction of the size of the list of data passed in) are randomly sampled and clustered as described above. The result of this is a basic vector classifier.

d. The next step is Outlier Detection. In this step the classifier that was automatically built from the centroids and samples of the aforementioned clustering is used against another larger random sample of points, ensuring points that were already used to build the model are not observed again. This process can add centroids to the clusters, and therefore add classes to the classifier with samples.

e. Next all data is passed through the classifier and grouped into the buckets based on their highest level of attraction to each centroid. This step has mild similarity, in concept, to a Random Forest algorithm, except the tree structure is only ever one branch deep.

f. The dynamic nature of this approach lends itself well to the high degree of noise and disparity in multispectral imagery.

DETAILED DESCRIPTION OF EXEMPLARY EMBODIMENTS

Figure 6:
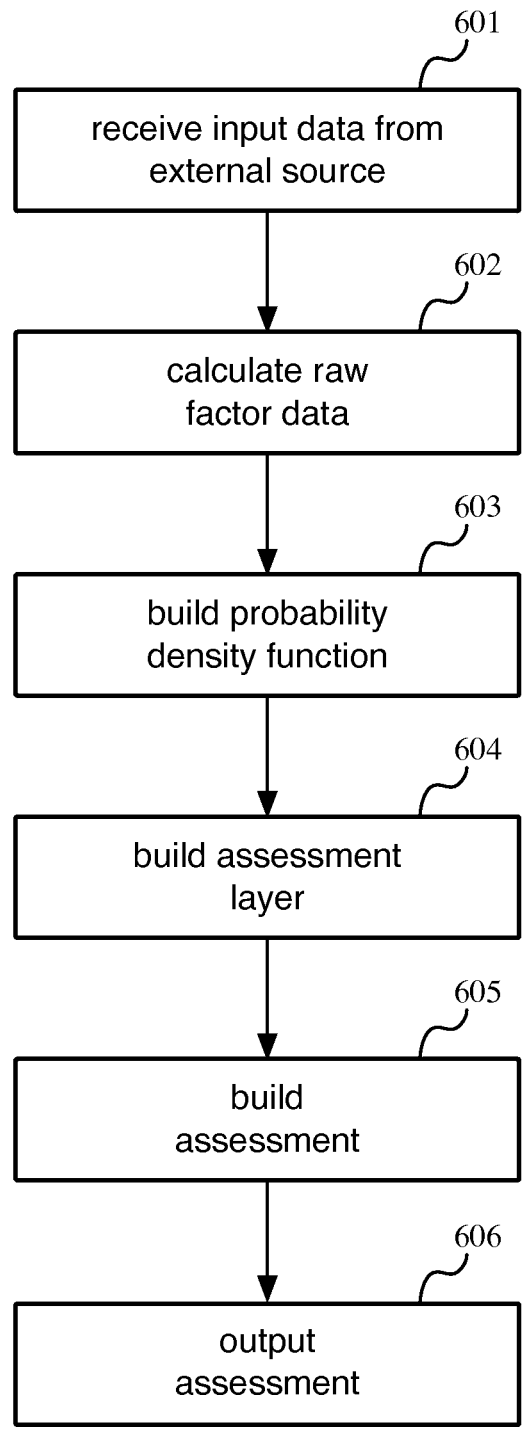
FIG. 6 is a method flow diagram illustrating and exemplary method for identifying and extracting image features, according to a preferred embodiment of the invention.

FIG. 6 is a method flow diagram illustrating an exemplary method 600 for identifying and extracting image features, according to a preferred embodiment of the invention. Where applicable, each algorithmic step or operation may be described in further detail and may include the use of exemplary program code samples or portions, and it should be appreciated that while reference may be made to specific names or terms, the code samples and explanations are exemplary in nature and may vary according to the embodiment.

In an initial step 601, a geospatial analysis server may receive input imagery such as from any of a variety of external data sources as described above (referring to FIG. 5). In a next step 602, the server may calculate raw factor data (RFD) from the input imagery. An RFD is generally a vector of doubles. In the case of categorical data, the RFD will also store a histogram map which is a map of strings to their corresponding enumerated value. In exemplary program code, while the RfdBuilder is the task that facilitates building an RFD the real work occurs in an FactorType-Function (FTF). A FTF is a component that takes factor attributes and a dataset as an input and creates an RFD. Example FTFs are Nearest Neighbor Distance (NND) and Inverse Distance Weighted (IDW). Two RFDs may be created in this stage of the processing—an EventRfd and an AoiRfd. The EventRfd is the RFD data for one factor and the events dataset. The AoiRfd is the RFD data for one factor and the AoiGrid dataset.

In a next step 603, the server may then build a plurality of probability density functions (PDFs). The EventPdf may be required when building an assessment; however the EnvironmentPdf is only used when calculating Integrate Signature or the Contrast Measure which is not shown in the diagram above. The PDF represents the distribution or 'signature' of a DataSet for a specific factor.

In a next step 604, the server may then build an assessment layer, for example by looking up AoiRfd values on the EventPdf curve. This results in the likelihood of an event occurring at a specific point in the AOI. Likelihood values are calculated for every point in the AOI which creates a likelihood surface for a single factor. In a next step 605, the server builds a final assessment by aggregating all the assessment layers into a final assessment. Obviously, only enabled assessment layers are used in the final assessment. Assessment layers are weighted by their factor weight, summed together and then divided by the sum of all enabled weights to determine the final assessment. In a final step 606, this assessment information may then be output such as to a database for storage and future reference, or to a display, GUI, or other software or hardware device for review or interaction by a human user.

Figure 7:
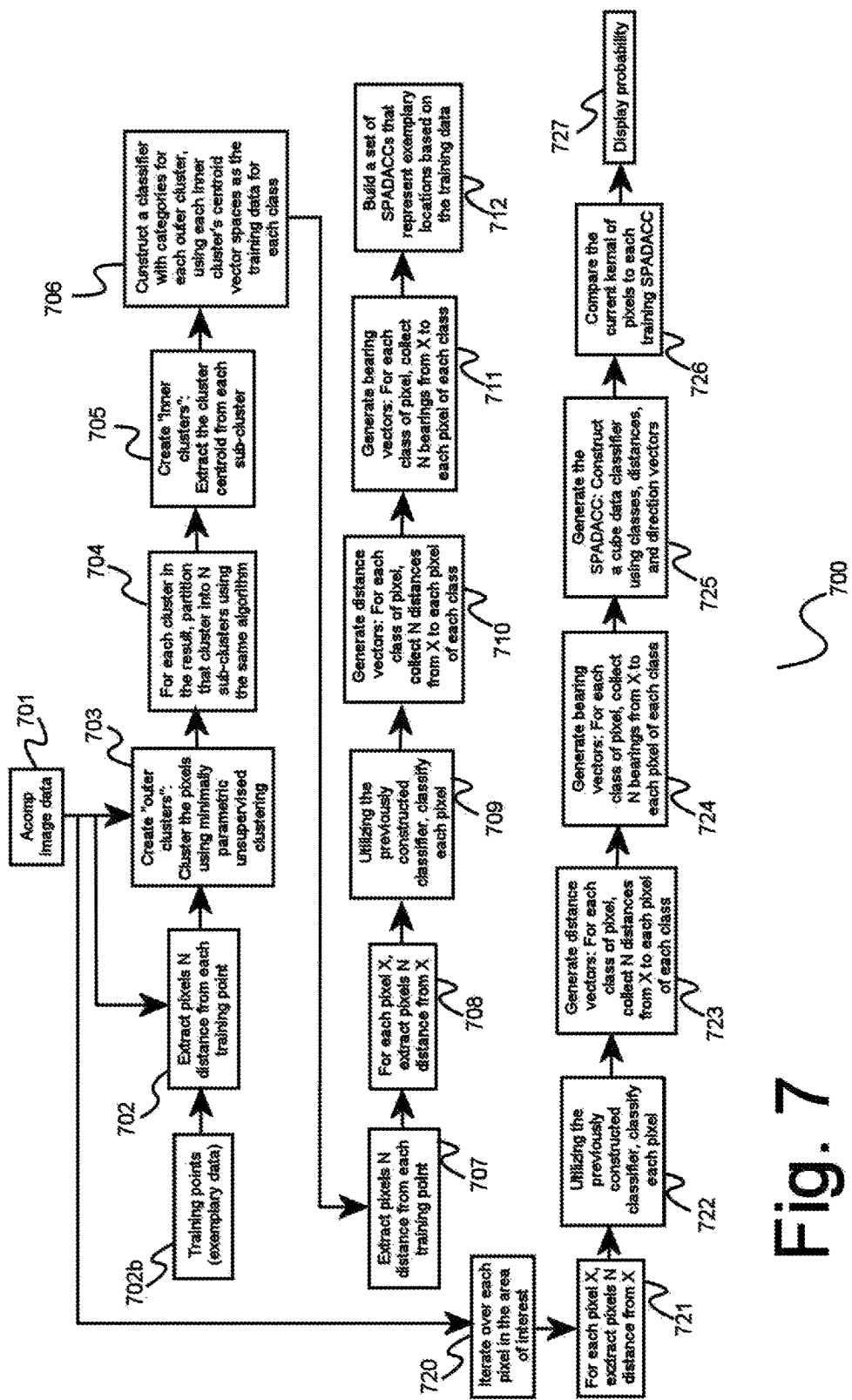
FIG. 7 illustrates an exemplary process of building a SPADACC from a plurality of ACOMP data, and then applying the SPADACC to the rest of an area of interest (AOI), which may comprise additional ACOMP data sets.

FIG. 7 illustrates an exemplary process 700 for building a SPADACC from a plurality of ACOMP data, and then applying the SPADACC to the rest of an area of interest (AOI), which may comprise additional ACOMP data sets.

In the following description, X may be used to refer to a plurality of ACOMP multispectral images 701, Xb to refer to a plurality of training points 702b, and Y to refer to a plurality of pixels in an AOI. According to the embodiment, the construction of a SPADACC may be performed according to an exemplary process described below.

In an initial step 702, for each training point TP in Xb, extract all pixels from around TP and add to a set of pixel objects. In a next step 703, cluster the set of pixels into a plurality of classes. According to an embodiment of the invention, a custom algorithm may be utilized in which a number of clusters is determined by a natural disparity in the data, rather than the typical method of a "K" parameter, typically seen in KMeans or KMedoids implementations. It can be appreciated that due to the highly volatile nature of image pixels (for example, considering variance due to change in season, region, time of day, reflectance, or other such variable image pixel qualities) such a method may be more pragmatic than hard-coding for a specified number of cluster centers.

In a next step 704, for each cluster centroid returned from a previous step 703, cluster the data in each centroid further into a plurality of classes, and then extract a mean vector representation for each of the new "inner classes", all of which may become new training data for use in the construction of a classifier.

In a next step 705, inner class vectors from a previous step 704 may now be used to build a classifier, in which the class labels of the classifier may be a numeric representation of the outer clusters and inner class vectors may be used as training data for those classes.

According to the embodiment, operation may iterate over the training points again in a next step 707, and in a next step 708 may extract a plurality of pixels from around each point and classify each pixel returned from this "buffer", resulting in a set of unlabeled features around each training point. In a next step 709, distance vectors may be calculated using an algorithm that finds a distance from a training pixel to a plurality of pixels of each category. According to the embodiment, a default number of dimensions for each vector may be configured, to configure for optimum performance while operating on a particular data set or for general performance (for example, if it is determined that exceeding a particular value results in data discrepancies). In a next step 710, bearing/direction vectors may be calculated from each category, and then in a next step 711 a SpectralFeatureGenerator object may be used to build a SPADACC. Operation may then continue for each training point, and in a final training step 712 the result may be a Set of SPADACCs, which ultimately constitute a highly dimensional MLT classifier.

According to the embodiment, a SPADACC Set may be used for continued "more like this" operation across the rest of an AOI according to an exemplary process described below.

In an initial step 720, operation may begin to iterate over each pixel of each image (ACOMPed). This may be accomplished in local mode, or may use a "map reduce" for example using HADOOP™. In a next step 721, for each pixel, a plurality of pixels may be collected, for example the same number of pixels used to train the model (such as described previously, referring to steps 702-712).

In a next step 722, each pixel in a buffer around a current pixel may be classified, for example using the same classifier that the SPADACC was built upon as described above. In next steps 723-725, a SpectralFeatureGenerator may be used to build a SPADACC representation of an area around the given pixel, resulting in a plurality of generated distance values and then producing bearing vectors and data classifiers, resulting in a SPADACC model. In a next step 726, the SPADACCs compare function may be used against a current AOI pixel's SPADACC, to compare an area around the pixel to a training model. In a final step 727, a probability is returned, and written to a store where it can be later visualized.

This process may continue until all pixels have been assigned a similarity value based on the SPADACC. Similarity values produced may ultimately result in a heat map, in which "hot spots" may be areas that are most similar to the training points as a whole.

According to the embodiment, a SPADACC compare function may comprise program code configured to: receive a set of data for testing, and a set of sample data; generate a hash for each set; compare hash keys from one set to the other using a cosine similarity function; apply a score weight to the results of a comparison function; compute a sum of weighted comparison values; and output the resultant comparison sum value.

According to the embodiment, a cosine similarity function may comprise program code configured to: receive as input, a plurality of lists of values; compare the size of the lists; iterate over a first list, performing a numerical comparison between the first list and a second list, returning the product of a comparison operation. According to the embodiment, a comparison operation may comprise the steps of: for a first list and a second list, calculating a magnitude for each list, wherein the magnitude is the product of taking a numerical value of an item in a list and squaring it; calculating a first product by multiplying the list values of a first and a second list; calculating a second product by multiplying the square root of the magnitude of a first list and the square root of the magnitude of a second list; and dividing the first product by the second product.

According to the embodiment, an unsupervised clustering model building function may comprise program code configured to: receive a set of data values, a first numerical precision value, and a second numerical precision value; taking a sample portion of a data set; iteratively processing a sample and comparing data within the sample to the precision values; and identifying numerical outliers based at least in part on the precision values. Further according to the embodiment, a spectral feature generator may comprise program code configured to: receive a plurality of input data points; for each point, determine a direction to a next point and then determine a distance vector between the points; append the direction and distance vectors into a sorted map, and output the sorted map.

The above describe exemplary models for program code, and it should be appreciated that there may be numerous particular ways to write program code to perform the described operations or achieve the described behaviors, and it should be further appreciated that a variety of arrangements may utilize additional or alternate program code, for example to expand functionality or integrate with specific products or services, or to utilize only particular desired operations without using program code for unused features.

The skilled person will be aware of a range of possible modifications of the various embodiments described above. Accordingly, the present invention is defined by the claims and their equivalents.

What is claimed is:

1. A system for enhanced geospatial modeling using a spectral data analytic cube classifier and normalized multispectral raster data, comprising:
   a geospatial modeling server computer comprising at least a processor, a memory, and a plurality of programming instructions stored in the memory and operating on the processor, wherein the programming instructions, when operating on the processor, cause the processor to:
      analyze and process input imagery, the processing comprising at least the operations of image normalization using atmospheric compensation through radiometric balancing, and feature extraction using a spectral data analytic cube classifier;
      provide the normalized image data to other components of the system;
   a database computer comprising at least a processor, a memory, and a plurality of programming instructions stored in the memory and operating on the processor, wherein the programming instructions, when operating on the processor, cause the processor to:
      store data received from other components of the system and provide the data for future review as needed;
   a data import/export server computer comprising at least a processor, a memory, and a plurality of programming instructions stored in the memory and operating on the processor, wherein the programming instructions, when operating on the processor, cause the processor to:
      provide data from other components of the system for review or interaction by a human user or external hardware or software devices; and
      receive data from a human user or external software or hardware devices and provide the data to other components of the system.

2. A method for geospatial modeling using raster data, comprising the steps of:
   receiving, at a geospatial analysis server, a plurality of input image data;
   performing image processing on the input image data, the processing comprising at least the operations of image normalization using atmospheric compensation through radiometric balancing, and feature extraction comprising calculating raw factor data based at least in part on at least a portion of the input image data;

building a plurality of probability density functions based at least in part on at least a portion of the raw factor data;

building a plurality of assessment layers based at least in part on at least a portion of the probability density functions; and building a final assessment based at least in part on at least a portion of the assessment layers.

* * * * *